METHOD AND DEVICE FOR PRODUCING MULTIPLE FILTER RODS FOR FILTER TIP CIGARETTES

Original Filed Oct. 14, 1959 2 Sheets-Sheet 1

Inventor
Carl Stelzer
by Michael J. Striker
Atty

Inventor
Carl Stelzer
by Malcolm J. Stokes
Atty.

United States Patent Office

Re. 25,917
Reissued Nov. 30, 1965

25,917

METHOD AND DEVICE FOR PRODUCING MULTIPLE FILTER RODS FOR FILTER TIP CIGARETTES

Carl Stelzer, Hamburg-Bergedorf, Germany, assignor to Hauni-Werke Korber & Co., K.G., Hamburg-Bergedorf, Germany Original No. 3,039,367, dated June 19, 1962, Ser. No. 846,483, Oct. 14, 1959. Application for reissue June 8, 1964, Ser. No. 385,818
Claims priority, application Germany Oct. 23, 1958
10 Claims. (Cl. 93—1)

Matter enclosed in heavy brackets [ ] appears in the original patent but forms no part of this reissue specification; matter printed in italics indicates the additions made by reissue.

The invention relates to a method and a device for producing filter rods of multiple customary length and which consist of alternately arranged filter bodies of different material. Such filter rods are used for producing filter type cigarettes which are provided with two or more filter bodies and in which, for instance, the filter body next to the tobacco rod has a carbon filling, while the filter body facing the mouth of the smoker consists of artificial fibres or of paper.

The object of the invention is a method and a device for producing the mentioned filter rods in a so-called transverse method in which the rods are moved transversely to their length. Since the length of the artificial filter bodies in multiple filter type cigarettes is usually smaller than the diameter of the filter body, it is difficult to align the filter bodies during the lengthwise movement and this difficulty is overcome in accordance with the invention in that the double length filter bodies which were produced by the customary subdivision of filter rods of the first mentioned type (carbon) during the transverse conveyance and the axial separation of the same to an approximately double customary length are inserted into the spaces of double length formed between axially aligned filter bodies of the second mentioned type, and thereupon this group of axially aligned filter bodies of alternately different materials is axially pushed together and wrapped into a wrapping band.

If it is the intention to produce filter rods in which between the mentioned filter bodies of different materials a vacant space is to be produced, then it is a further object of the invention that the filter bodies which are cut from one of the filter rods and the filter bodies of double customary length are moved apart beyond the extent of the length of the filter bodies prior to the step in which the filter bodies which are cut from the other filter rods are inserted into the spaces formed between the first mentioned filter bodies.

This axially slidable separation of the filter bodies of one of the two filter rods is also advisable, perhaps to a somewhat less extent, in order to facilitate the insertion of the filter bodies of the second type of filter rod (fibres or paper). It is necessary, however, that after the filter bodies of the two types of filter rods have been inserted, the filter bodies are again moved slidably together before these filter bodies are wrapped into paper, cardboard or the like. This wrapping takes place in known manner and the filter body so produced can be further worked upon in that it is divided into two portions, of which each has in its center a double length filter body and at its ends a single length filter body. These composite rod portions are then placed between two cigarettes and connected with these cigarettes by a connecting band and this assembly is then cut in its center. The result is a filter tip cigarette with two different types of filter bodies.

The invention will now be described with reference to the accompanying drawings which illustrate a method for producing such filter rods in a diagrammatic manner, but in which between the two filter rods there is not provided a vacant space.

Figure 5:
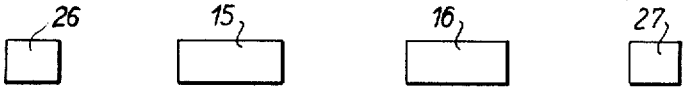
FIG. 5 shows the arrangement of the single length and double length filter bodies made from the filter rod of FIG. 3 and 4 respectively.
Figure 6:
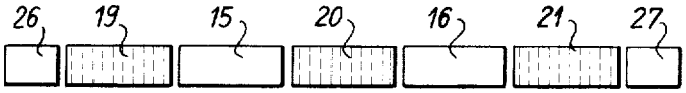
FIG. 6 shows the insertion of the double length filter bodies of FIG. 2 between the filter bodies of FIG 5.
Figure 7:
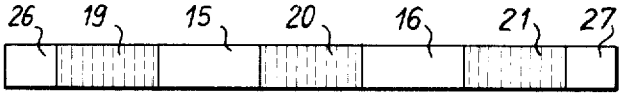
FIG. 7 shows the filter body group of FIG. 6 when axially pushed together.
Figure 12:
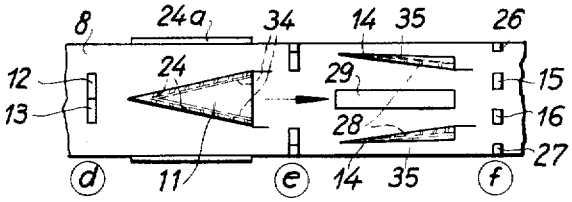
Figure 13:
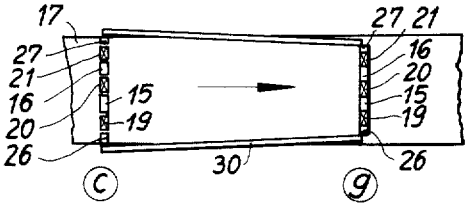

FIG. 12 shows a portion of the unwound circumference of another drum of the device for cutting and for axially sliding apart the single length filter bodies and the double length filter bodies (see FIGS. 3, 4 and 5), and FIG. 13 shows a portion of the unwound circumference of still another drum of the device upon which the group of axially aligned and spaced filter bodies is assembled and then is axially pushed together (see FIGS. 6 and 7).

Figure 11:
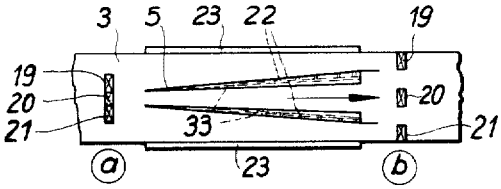
FIG. 11 illustrates a portion of the unwound circumference of one drum of the device and the means thereon for slidably moving the double filter bodies axially apart (see also FIGS. 1 and 2)

The FIGS. 11 to 13 illustrate only filter rod portions which are shown in the FIGS. 1 to 7.

The method of making composite or multiple filter rods according to the invention will now be described with reference to the illustrated device.

Figure 1:
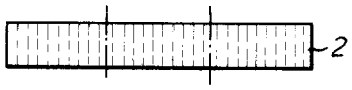
FIG. 1 shows a filter rod of six times customary length from which the filter bodies are made which are spaced from the adjacent end of the tobacco rod.
Figure 2:
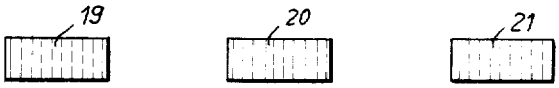
FIG. 2 shows three axially spaced filter bodies of double customary length produced from the filter rod of FIG. 1.
Figure 10:
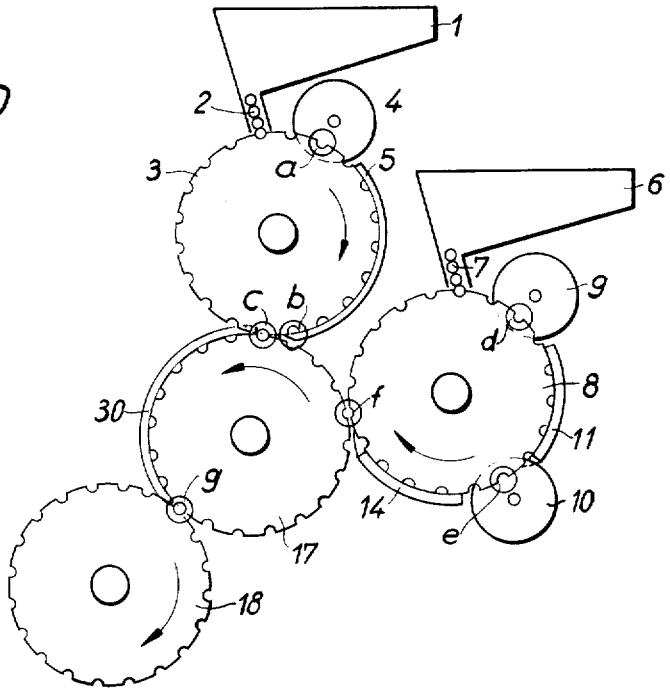
FIG. 10 illustrates diagrammatically a side elevation view of a device for producing the composite filter body rods of the present invention.

Referring to FIG. 10 the device is provided with a magazine 1 containing filter rods 2 such as are shown in FIG. 1. The rotary filter rod receiving drum 3 is provided with two axially spaced circular knives 4 and two laterally spaced guide plates 5 (see also FIG. 11). Another magazine 6 contains filter rods 7 of the type illustrated in FIG. 3 and this filter magazine supplies the filter rods 7 to another rotary drum 8 which latter cooperates with a single circular knife 9 arranged in the direction of rotation of the drum in circumferential spaced relation from the point where the magazine 6 delivers the filter rods 7 to the drum 8. This rotary knife 9 is used for the performance of the central cut indicated in FIG. 3. Two additional axially spaced circular knives 10 which cooperate with another circumferential portion of the drum 8 serve the purpose of cutting double length filter bodies from the filter rods 12 and 13 as shown in FIG. 4. A guide plate 11 which extends circumferentially between the circumferentially spaced circular knives 9 and 10 is used for moving the two rod portions 12 and 13 in axial direction outwardly. In rear of the two axially spaced circular knives 10 are arranged two laterally spaced guide plates 14 which serve the purpose of moving the double length filter bodies 15 and 16 toward each other as also shown in FIG. 12. The rotary drums 3 and 8 deliver the cut filter bodies onto an assembly drum 17 upon which the groups of filter bodies are axially moved together as shown in FIG. 13.

In place of the axial movements of the filter bodies it would also be possible to provide mechanical means which, for instance, may consist of a base upon which the filter bodies are placed, whereupon the base and the filter bodies thereon are reciprocated back and forth. In the following it will be assumed that the mentioned back and forth movement of the filter bodies is accomplished by a suitable back and forth movement of the base upon which the filter bodies are placed. The wrapping of the groups of filter bodies, which are axially pushed together, takes place upon a wrapping drum 18 to which the filter body groups were transferred from the assembly drum 17.

The pointed ends of the guide plates 5, 11 and 14, which are wedge-shaped, are positioned in the indicated cutting planes and are also arranged close to the respective circular cutters 4, 9 and 10. The push surfaces of the guide plates are provided with perforations 22, 24 and 28 which serve as nozzles and which are connected with compressed air conduits 33, 34 and 35. These conduits and nozzles are located as closely as possible near the pointed ends of the guide plates 5, 11 and 14. Therefore, after an initial mechanical axial displacement of the filter bodies or rod portions the compressed air discharged from the perforations 22, 24 and 28 will be directed against the end faces of the filter bodies to be axially displaced. This results in a same displacement without any excessive mechanical stresses.

The device operates as follows:

The filter rods 2 and 7 are inserted by the magazines 1 and 6 respectively into the axial grooves of the rotary drums 3 and 8. This insertion may be accomplished by any one of well known devices, for instance by a device as described in Ritscher and Schubert's U.S. patent application Serial No. 576,452, filed on April 5, 1956, *now U.S. Patent No. 2,918,197*. During the rotation of the drum 3 the filter rods 2 are moved past the circular cutters 4 and are cut at the point a as shown in FIGS. 10 and 11 into three portions 19, 20 and 21 (FIG. 2), each having a length which is twice the length of a customary filter body. Of these double length filter rod portions 19, 20 and 21, the outer ones 19 and 21 then are axially displaced as shown in FIG. 11 by two laterally spaced guide plates 5. At the beginning the guide plates 5 move these two outermost filter rod portions 19 and 21 mechanically apart, but soon thereafter a substantial portion of the axial displacement is caused by compressed air which is discharged from the nozzle-like apertures 22 provided in these guide plates 5. The axial displacement of the outermost filter rod portions 19 and 21 is limited by the abutment rails 23 which extend circumferentially along the end faces of the drum 3, but obviously are mounted fixedly to some portion of the machine frame and any recoil movement of the filter rod portions 19 and 21 when they engage the abutment rails 23 is straightened out by the rear ends of the guide plates 5.

The three filter rod portions 19, 20 and 21 which assume now the axially spaced position as shown in FIGS. 10 and 11 at the point b are now transferred at the point c to the assembly drum 17 which previously received from the drum 8 four axially spaced filter rod portions 26, 15, 16 and 27 as will be described presently. The filter rod portions 19, 20 and 21 are inserted into the spaces which are formed between the filter rod portions 26, 15, 16 and 27.

Figure 3:
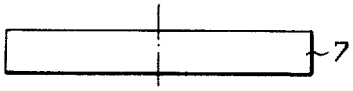
FIG. 3 shows a filter rod of another material of six times customary length from which the filter bodies are made which are placed adjacent one end of the tobacco rod.
Figure 4:
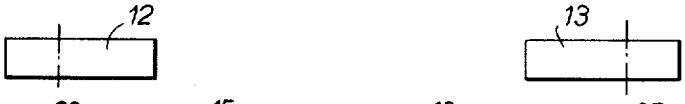
FIG. 4 shows the two halves of the filter body of FIG. 3 in an axially spaced relation.

The filter rods 7 which are inserted into the axial grooves of the rotary drum 8 are first cut into two filter rod portions 12 and 12 by the circular rotary knife 9 at the point d as shown in FIGS. 10 and 12 and also in FIG. 3. According to FIG. 12 these two rod portions 12 and 13 are axially moved apart by a wedge-shaped guide plate 11 which also is provided with nozzle-shaped apertures 24 through which compressed air is forced. This compressed air is directed against the inner end faces of the rod portions 12 and 13 and forces the rod portions against abutment rails 24a arranged at the end faces of the drum 8, but obviously these abutment rails 24a are fixedly mounted on some kind of a portion of the machine frame. In this axially spaced position as shown in FIG. 4 the filter rod portions 12 and 13 are spaced a distance apart somewhat in excess of the total length of the filter rod 2. In the position illustrated in FIG. 4 the filter rod portions 12 and 13, which preferably consist of a different material than the filter rod 2, are maintained securely by suction produced by suction conduits in the axial grooves of the drum 8. When the rotary drum 8 continues its rotation, the filter rod portions 12 and 13 are cut into two portions of different length by the two axially spaced circular cutters 10 (FIG. 10). The outermost portions 26 and 27 (FIGS. 5 and 12) have a length equal to a single length of a customary filter body while the two innermost filter body portions 15 and 16 have a length twice that of a customary filter body. These two double length filter rod portions 15 and 16 are now moved axially in a direction toward each other by two laterally spaced guide plates 14 which extend along the circumference of the drum 8 and are fixedly secured in place in similar manner as the other guide plates 5 and 11. These guide plates 14 are also provided with nozzles 28 which direct compressed air against the end faces of the filter rod portions 15 and 16 and moves the same against opposite sides of a single abutment rail 29 at the point f shown in FIGS. 10 and 12 so that the four filter rod portions 26, 15, 16 and 27 will now have the relative position as shown in FIG. 5. In this axially spaced relation the filter rod portions 26, 15, 16 and 27 are transferred to a third rotary assembly drum 17.

Figure 8:
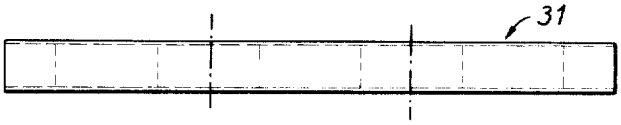
FIG. 8 illustrates the filter body group of FIG. 7, but provided with a wrapping and also indicating the points at which this filter body group will be cut.
Figure 9:
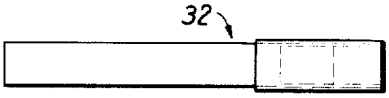
FIG. 9 illustrates a double filter type cigarette.

As already mentioned previously, when the rotary drum 17 received in its axial grooves at the point f the filter rod portions 26, 15, 16 and 27, the same grooves will receive at the point c the filter rod portions 19, 20, 21 from the rotary drum 3. This transfer takes place in such a manner that the filter rod portions 19, 20, 21 are inserted into the spaces formed between the filter rod portions 26, 15, 16, 27. The two different types of filter rod portions 26, 19, 15, 20, 16, 21 and 27 have now the axial aligned and axial spaced position as shown in FIG. 6 on the drum 17 at the point c. This group of axially aligned and axially spaced filter rod portions is now axially pushed together by fixedly mounted guide rails 30 arranged at the ends of the drum 17. This axial movement of the filter rod portions into a position as shown in FIG. 7 at the point g in FIGS. 10 and 13 may be accomplished by a device such as is disclosed in the British patent specification No. 763,912. The closely assembled group of filter rod portions 26, 19, 15, 16, 21 and 27 is now transferred at the point c to a rotary wrapping drum 18. On this wrapping drum 18 the entire axially compacted group of filter rod portions is wrapped into a connecting band 31 as shown in FIG. 8. Thereupon this longitudinal filter rod assembly is cut into three lengths as indicated by the two cutting lines 36 and 37 so as to form three composite filter rods. These composite filter rods are then placed into a space formed between two axially spaced and axially aligned cigarettes 32 and thereupon this cigarette assembly is cut in its center so as to form two completed cigarettes one of which is shown at FIG. 9.

What [we] *I* claim is:

1. In a method of producing composite filter rods for multiple filter tip cigarettes in which the filter rods are composed of filter bodies of different material, the steps of subdividing a first filter rod of one material and having a length of three times the double customary length in three double length bodies while moving said rod in a circular path, axially moving these three bodies in said circular path apart a distance somewhat in excess of their length, subdividing a second filter rod of another material and having the same length as the first filter rod into two portions of equal length while moving in a second circular path, and moving these two body portions axially apart a distance equal to their double length, cutting from each of these two last named body portions while moving in said second circular path a filter body of single customary length from the outermost ends of the two body portions of equal length and spacing the four filter bodies formed an axial distance apart which is somewhat greater than the length of a double length filter body, inserting said first formed filter bodies of double customary length into the spaces formed between said four filter bodies, pushing all of said filter bodies axially together and wrapping a connecting band around the group of axially aligned filter bodies.

2. In a method of producing composite filter rods for multiple filter tip cigarettes in which the filter rods are composed of filter bodies of different materials, the steps of subdividing a first filter rod of one material and having a length of three times the double customary length in three double length bodies while moving said rod in a circular path, axially moving these three bodies in said circular path apart a distance somewhat in excess of their length, subdividing a second filter rod of another material and having the same length as the first filter rod into two portions of equal length while moving in a second circular path, and moving these two body portions axially apart a distance equal to their double length, cutting from each of these two last named body portions while moving in said second circular path a filter body of single customary length from the outermost ends of the two body portions of equal length and spacing the four filter bodies formed an axial distance apart which is somewhat greater than the length of a double length filter body, inserting in a third circular path to which the four axially spaced filter bodies have been transferred said first formed filter bodies of double customary length into the spaces formed between said four filter bodies, pushing all of said filter bodies axially together in said third circular path and wrapping a connecting band around the group of axially aligned filter bodies.

3. A method of producing cigarette filter rods composed of abutting unit-length elements of different materials, comprising the steps of cutting a six-unit filter rod of one material into three two-unit pieces, shifting said pieces axially to space them apart a distance slightly in excess of the length of one two-unit piece, cutting a six-unit filter rod of another material into two three-unit pieces, shifting said two three-unit pieces axially to space them apart a distance equal to six unit lengths, cutting from the outer end of each of said three-unit pieces one unit piece, shifting the four pieces of said other material thus obtained axially apart a distance slightly in excess of the length of one two-unit piece, moving said three pieces of the first material and said four pieces of said other material transversely relative to each other to insert said three pieces of the first material in alignment with said four pieces of said other material in the spaces between the latter four pieces, moving said aligned pieces axially into abutment with each other to form a twelve-unit long element having a severed one-unit element at each end thereof, winding a wrapper around said twelve-unit long element, and cutting each of said wrapped two-unit pieces into two-unit-length elements, whereby six two units long composite filter rods are obtained.

*4. In a method of producing cigarette filter rods composed of unit-length pieces of different material, the steps of cutting a filter rod of one material having a length which is an even multiple of a unit length into double-unit-length intermediate and unit-length end pieces; cutting a filter rod of another material and having a length which is the same multiple of a unit length as the length of the filter rod of said one material into double-unit-length pieces; moving the pieces of each filter rod away from each other and thereupon moving the pieces of said filter rods into alignment with each other with said pieces of one of said filter rods alternating with said pieces of the other of said filter rods so that said unit-length end pieces of said one material are located at the opposite ends of the resulting assembly of aligned pieces; and winding a wrapper around said assembly.*

*5. In a method of producing cigarette filter rods composed of unit-length pieces of different material, the steps of cutting a filter rod of one material having a length which is an even multiple of a unit length into double-unit-length intermediate and unit-length end pieces; cutting a filter rod of another material and having a length which is the same multiple of a unit length as the length of the filter rod of said one material into double-unit-length pieces; moving double-unit-length pieces of said one material between correspondingly spaced double-unit-length pieces of said other material and moving said unit-length end pieces of said one material at the opposite ends of the thus formed row of alternately arranged double-unit length pieces so as to form an assembly of aligned pieces; and winding a wrapper around said assembly.*

*6. In a method of producing composite filter rods, the steps of severing from a first filter rod two pieces of unit length and at least one piece of double unit length located between said pieces of unit length and moving said pieces sideways; severing from a second filter rod at least two pieces of double unit length and moving each such piece between two consecutive pieces of said first filter rod to form an assembly wherein pieces of said first filter rod alternate with pieces of said second filter rod and wherein said pieces of unit length are located at the ends; and winding a wrapper around said assembly .*

*7. In a method as set forth in claim 6, the additional step of moving the wrapped assembly sideways.*

*8. In a method as set forth in claim 6, the additional step of subdividing the moving assembly by severing it midway across each such piece of double unit length which is obtained by subdividing said first filter rod.*

*9. In a method of producing composite filter rods, the steps of severing from a first filter rod two pieces of unit length and at least one piece of double unit length located between and aligned with said pieces of unit length; moving said pieces sideways and also moving said pieces axially and away from each other; severing from a second filter rod at least two pieces of double unit length and moving each such piece between and into axial alignment with two consecutive pieces of said first filter rod to form an assembly wherein pieces of said first filter rod alternate with pieces of said second filter rod and wherein said pieces of unit length are located at the ends; and wrapping a wrapper around said assembly.*

*10. In a method as set forth in claim 9, the additional step of reducing the distance between said pieces of unit length to move all pieces of said assembly into actual abutment with each other prior to wrapping.*

References Cited by the Examiner

The following references, cited by the Examiners, are of record in the patented file of this patent or the original patent.

UNITED STATES PATENTS

| | | | |
|---|---|---|---|
| 2,821,201 | 1/1958 | Brunsing | 93—1 |
| 2,882,970 | 4/1959 | Schur | 93—1 |
| 2,898,998 | 8/1959 | Schur | 93—1 |
| 2,920,631 | 1/1960 | Korber | 93—1 |

FOREIGN PATENTS

| | | |
|---|---|---|
| 970,401 | 1/1951 | France. |

FRANK E. BAILEY, *Primary Examiner.*

BERNARD STICKNEY, *Examiner.*